US012730882B2

(12) United States Patent
Jadhav et al.

(10) Patent No.: US 12,730,882 B2
(45) Date of Patent: Sep. 8, 2026

(54) SYSTEM AND METHOD FOR TAINTING SUSPICIOUS PROCESS AND APPLYING TARGETED RULES THEREOF

(71) Applicants: Rahul Arvind Jadhav, Bangalore (IN); Barun Acharya, Ghaziabad (IN)

(72) Inventors: Rahul Arvind Jadhav, Bangalore (IN); Barun Acharya, Ghaziabad (IN)

( * ) Notice: Subject to any disclaimer, the term of this patent is extended or adjusted under 35 U.S.C. 154(b) by 225 days.

(21) Appl. No.: 18/534,534

(22) Filed: Dec. 8, 2023

(65) Prior Publication Data

US 2024/0232337 A1 Jul. 11, 2024

Related U.S. Application Data

(60) Provisional application No. 63/428,263, filed on Jan. 6, 2023.

(51) Int. Cl.
*G06F 21/55* (2013.01)

(52) U.S. Cl.
CPC ...... *G06F 21/552* (2013.01); *G06F 2221/034* (2013.01)

(58) Field of Classification Search
CPC ......................... G06F 21/552; G06F 2221/034
See application file for complete search history.

(56) References Cited

U.S. PATENT DOCUMENTS

2021/0200864 A1* 7/2021 Rudnik ................ G06F 21/567
2022/0329616 A1* 10/2022 O'Hearn ................ G06F 9/545
2023/0409715 A1* 12/2023 Nissim ............... G06F 9/45533

* cited by examiner

*Primary Examiner* — Beemnet W Dada
*Assistant Examiner* — Sayeda Salma Nahar
(74) *Attorney, Agent, or Firm* — Joy S Goudie; Goudie, PLLC

(57) ABSTRACT

The embodiments herein provide a system and method for tainting suspicious processes and applying targeted rules thereof are provided. The method involves tainting/tagging/marking unknown process and allowing execution of the unknown process, such that on identifying the unknown process, which tries to access a sensitive asset such as raw database tables or unknown process which carries out an operation that is usually considered advanced such as establishing network connection to external network, blocking the access or operation of the unknown process or increasing the severity level of the alert that is generated as a part of the sensitive access or operation of the unknown process.

18 Claims, 8 Drawing Sheets

SYSTEM AND METHOD FOR TAINTING SUSPICIOUS PROCESS AND APPLYING TARGETED RULES THEREOF

REFERENCE TO RELATED APPLICATIONS

The present application claims the priority of the US Provisional Patent Application (PPA) with Ser. No. 63/428,263 filed on Jan. 6, 2023. The contents of the abovementioned Application are included in entirety as reference herein.

BACKGROUND

The embodiments herein, in general, relate to security policy enforcement. More particularly, the embodiments herein relate to a system and a method for tainting suspicious processes and applying targeted rules thereof.

DESCRIPTION

Application Hardening refers to protecting an application against attacks/exploits by removing vulnerabilities or by ensuring that unknown actions are not permitted in the application. Unknown actions might involve unknown process invocation, unknown file-system accesses, or use of previously unused capabilities such as raw sockets or use of unknown network connections.

A typical enterprise's infrastructure has grown increasingly complex. A single enterprise may operate several internal networks, remote offices with their own local infrastructure, remote and/or mobile individuals, and cloud services. This complexity has outstripped legacy methods of perimeter-based network security as there is no single, easily identified perimeter for the enterprise. Perimeter-based network security has also been shown to be insufficient since once attackers breach the perimeter, further lateral movement is unhindered. This complex enterprise has led to the development of a new model for cybersecurity known as "zero trust" (ZT).

A ZT approach is primarily focused on data and service protection but can be expanded to include all enterprise assets (devices, infrastructure components, applications, virtual and cloud components) and subjects (end users, applications, and other non-human entities that request information from resources). One of the tenets of Zero Trust Security is the use of least permissive application behavior, wherein the application behavior is observed over a period of time and a set of application actions are derived such as what processes are forked/executed, what file system accesses are made, what advanced capabilities (such as raw sockets, setuid, setgid) are used by the application. Subsequently, a Zero Trust policy is enforced wherein only the known (previously seen) behavior is permitted within the application. For e.g., if the application spawn's processes /usr/bin/abc and /usr/bin/xyz during its lifetime then this behaviour is learnt and subsequently a policy is created that only allows these two processes to be spawned within the application.

Hence, the Zero Trust Security model focuses on the eventuality of a Zero-day (0-day or 0 d) attack, wherein the attacker leverages an unknown exploit in the application and injects their binaries in the system and then tries to execute it. Zero Trust model will ensure that only known binaries are allowed to be executed. Thus, the model provides security for unknowns without depending on signature-based threat modelling.

However, identifying a Zero Trust Security Posture is incredibly difficult because it may not be possible to know all the application behavior by modeling it in a limited time frame. Lots of time, the application might spawn a binary process once in a while (for example periodic backup) and thus, this behavior might not be modeled. Therefore, when the Zero Trust posture is enforced, the new binary execution might lead to audit/alert events or worse might be blocked resulting in the failure of the application. Furthermore, while the application is updated and the integration test suites do not cover the full lifecycle of the application, this results in incomplete observation of application behavior.

FIG. 1 illustrates a prior art diagram depicting a comparison between typical runtime security enforcement vs. zero trust runtime security enforcement. The FIG. 1 100 illustrates that the Zero Trust runtime security enforcement requires one to identify the permitted behavior and deny everything else.

Hence, there is a long-felt need for a system and a method for tainting suspicious processes and applying targeted rules for such processes, by reducing the risk of enforcing the Zero Trust security posture, while addressing the above-recited problems associated with the related art.

The above-mentioned shortcomings, disadvantages, and problems are addressed herein, and which will be understood by reading and studying the following specification.

BACKGROUND OF THE INVENTION

The principal object of the embodiment herein is to provide a system and a method for tainting suspicious processes and applying targeted rules thereof.

Another object of the embodiment herein is to provide a system and method for tainting suspicious process and applying targeted rules, by identifying an unknown process, tainting/tagging the unknown process, and allowing to carry out operations that might be considered not so dangerous, but if the unknown process tries to access any sensitive asset or operation, then blocking that operation and raising an alert.

Yet another object of the embodiment herein is to designate certain data files or process files as sensitive assets.

Yet another object of the embodiment herein is to designate certain operations as sensitive operations.

Yet another object of the embodiment herein is to identify an unknown process and to taint the unknown process.

Yet another object of the embodiment herein is to allow the execution of the tainted unknown process that might be considered not suspicious.

Yet another object of the embodiment herein is to block the operation of the unknown process, if the unknown process tries to access any sensitive asset or operation, and thereby raising an alert.

These and other objects and advantages of the present invention will become readily apparent from the following detailed description taken in conjunction with the accompanying drawings.

SUMMARY OF THE INVENTION

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This Summary is provided to introduce a selection of concepts in a simplified form that is further described below in the Detailed Description. This Summary is not intended to identify key or essential features of the claimed subject matter, nor is it intended to be used as an aid in determining the scope of the claimed subject matter.

The various embodiments herein provide a system and method for tainting suspicious process and applying targeted rules thereof. The embodiments herein comprise tainting/tagging/marking unknown process and allowing execution of the unknown process, such that on identifying the unknown process, which tries to access a sensitive asset such as raw database tables or an unknown process that carries out an operation that is usually considered advanced such as establishing a network connection to external network, blocking the access or operation of the unknown process or increasing the severity level of the alert that is generated as a part of the sensitive access or operation of the unknown process.

According to one embodiment herein, a method for tainting suspicious processes and applying targeted rules is provided. The method comprises logging telemetry data, transferring the logged telemetry data over a network, and consolidating and aggregating the logged telemetry data received from multiple workloads. The method further includes identifying workload behavior and transmitting known behavior information. In addition, the method includes monitoring workload behavior upon receiving the known behavior information. The workload behavior includes both known and unknown processes, applications that require access to one or more sensitive assets and file system paths, and processes using sensitive operations. The method further involves tainting the unknown process, on detecting the unknown process while monitoring the workload behavior. Furthermore, the method involves blocking the access and operation of the tainted unknown process, and raising an alert while the tainted unknown process tries to access the sensitive assets or sensitive operations.

According to one embodiment herein, the telemetry data is a kernel event concerning workload behavior with cloud context and includes details about the process, file system, network, and system call activities.

According to one embodiment herein, the method is aided by a plurality of components including a Container Network Interface (CNI) and a Container Orchestration System. The CNI is responsible for managing the network operations and carrying out policy decisions for ingress and egress communication, and the container orchestration system, such as Kubernetes helps to access logs, system audit logs, and service mesh policy violations.

According to one embodiment herein, the workload behavior is the event generated in the form of telemetry data. The workload behavior includes various processes that are being executed, various applications that require access to one or more sensitive assets and file system paths, and various processes using sensitive operations, such as network connections, use of raw sockets, setgid( ), setsuid( ) etc.

According to one embodiment herein, the known behavior information includes a list of processes that are allowed to be executed, and also the list of sensitive assets and operations accessed by the list of processes. Furthermore, while transmitting known behavior information security policies are created. The method for creating security policies is provided. The method includes receiving telemetry data over the network, identifying workload behavior and generating workload behavior summary, identifying sensitive assets, generating security policies, and transmitting security policies over the network. In addition, the workload behavior summary is generated by aggregating telemetry data in a data store.

According to one embodiment herein, the sensitive assets are entities in an application workload that contain valuable information and require heightened protection due to their critical nature.

According to one embodiment herein, the method also involves automatically adding mount points, network ports, and/or privileged capabilities and blocking access to sensitive assets.

According to one embodiment herein, the known process of the workload behavior includes a list of Linux binary executions that are part of known workload behavior and the unknown process includes the list of Linux binary executions that are not part of known workload behavior. Furthermore, the known workload behavior is the workload behavior that is already generated, aggregated, profiled, and analyzed by the method.

According to one embodiment herein, the tainting involves setting a flag in the context of the unknown process in the kernel. On generating the security policies that have the set of known processes and their access to the sensitive assets, the method monitors the activities of each and every process. However, on detecting the unknown processes the method starts tracking the unknown process in the kernel by leveraging security instruments and allows arbitrary access to the unknown process that does not access the sensitive assets while blocking the unknown process and denying access if it accesses the sensitive assets. The security instruments may be kernel-level instruments, such as Linux Security Modules, eBPF, and Seccomp, or user space kernel mechanisms like PTrace and LD_Preload.

According to one embodiment herein, a system for tainting suspicious processes and applying targeted rules is provided. The system comprises an observability and enforcement engine configured to log and transfer telemetry data. The system further comprises a discovery engine, which is a control pane element, configured to receive the logged telemetry data from the observability and enforcement engine over a network, and also configured to consolidate and aggregate the logged telemetry data from multiple workloads. Further, the discovery engine is also configured to identify workload behavior and transmit known behavior information to the observability and enforcement engine to monitor the workload behavior. The workload behavior includes both known and unknown processes, applications that require access to one or more sensitive assets and file system paths, and processes using sensitive operations. In addition, the observability and enforcement engine is also configured to taint the unknown process, while monitoring the workload behavior, block the access and operation of the tainted unknown process, and raise an alert while the tainted unknown process tries to access sensitive assets or sensitive operations.

According to one embodiment herein, the telemetry data is a kernel event concerning workload behavior with cloud context and includes details about the process, file system, network, and system call activities.

According to one embodiment herein, the observability and enforcement engine, and the discovery engine are aided by a plurality of components including a Container Network Interface (CNI) and a Container Orchestration System. The CNI is responsible for managing the network operations and carrying out policy decisions for ingress and egress communication, and the container orchestration system, such as Kubernetes helps to access logs, system audit logs, and service mesh policy violations.

According to one embodiment herein, the workload behavior of the discovery engine is the event generated in the form of telemetry data. The workload behavior includes various processes that are being executed, various applications that require access to one or more sensitive assets and file system paths, and various processes using sensitive operations, such as network connections, use of raw sockets, setgid ( ), setsuid ( ), etc.

According to one embodiment herein, the known behavior information includes a list of processes that are allowed to be executed, and also the list of sensitive assets and operations accessed by the list of processes. Furthermore, while transmitting known behavior information by the discovery engine to the observability and enforcement engine, security policies are created. The method for creating security policies by the discovery engine is provided. The method includes receiving telemetry data over the network, identifying workload behavior and generating workload behavior summary, identifying sensitive assets, generating security policies, and transmitting security policies over the network. In addition, the workload behavior summary is generated by aggregating telemetry data in a data store.

According to one embodiment herein, the sensitive assets are entities in an application workload that contain valuable information and require heightened protection due to their critical nature.

According to one embodiment herein, the observability and enforcement engine is also configured to automatically add mount points, network ports, and/or privileged capabilities and block, access to the sensitive assets.

According to one embodiment herein, the known process of the workload behavior includes a list of Linux binary executions that are part of known workload behavior and the unknown process includes the list of Linux binary executions that are not part of known workload behavior. Furthermore, the known workload behavior is the workload behavior that is already generated, aggregated, profiled, and analyzed by the system.

According to one embodiment herein, the tainting by the observability and enforcement engine involves setting a flag in the context of the unknown process in the kernel. The discovery engine generates the security policies that have the set of known processes and their access to the sensitive assets and transmits the security policies comprising the set of known processes and their access to the sensitive assets to the observability and enforcement engine. The observability and enforcement engine monitors the activities of each and every process. However, on detecting the unknown processes the observability and enforcement engine starts tracking the unknown process in the kernel by leveraging security instruments and allows arbitrary access to the unknown process that does not access the sensitive assets while blocking the unknown process and denying access if it accesses the sensitive assets. The security instruments may be kernel-level instruments, such as Linux Security Modules, eBPF, and Seccomp, or user space kernel mechanisms like PTrace and LD_Preload.

The foregoing summary is illustrative only and is not intended to be in any way limiting. In addition to the illustrative aspects, embodiments, and features described above, further aspects, embodiments, and features will become apparent by reference to the drawings and the following detailed description.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The other objects, features and advantages will occur to those skilled in the art from the following description of the preferred embodiment and the accompanying drawings in which.

Figure 1:
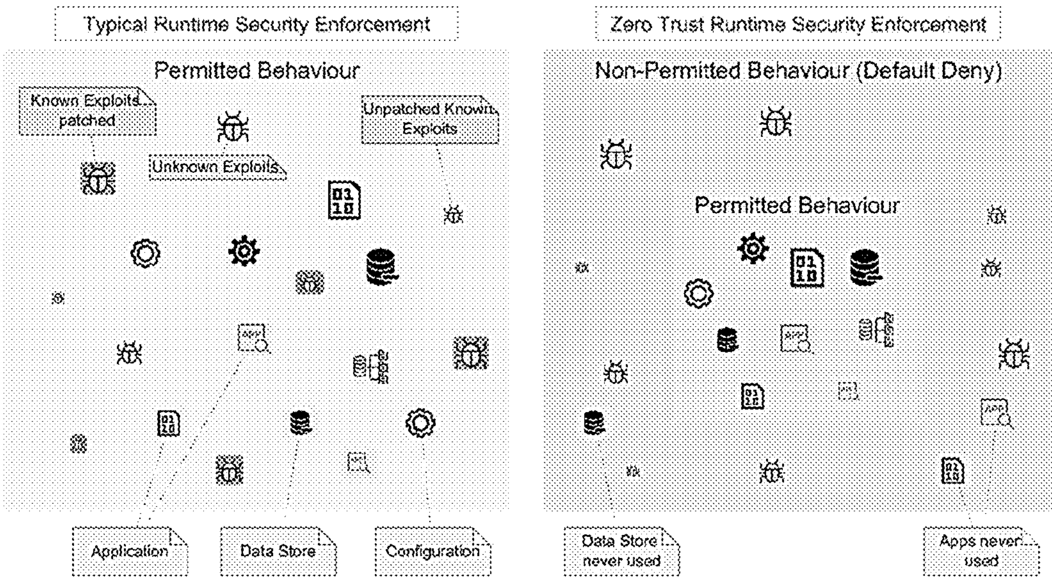
FIG. 1 illustrates a block diagram indicating a comparison between typical runtime security enforcement vs zero trust runtime security enforcement, according to a prior art.

Although the specific features of the present invention are shown in some drawings and not in others. This is done for convenience only as each feature may be combined with any or all of the other features in accordance with the present invention.

BEST MODE FOR CARRYING OUT THE INVENTION

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The foregoing of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The various embodiments herein provide a system and method for tainting suspicious processes and applying targeted rules thereof. The embodiments herein comprise tainting/tagging/marking unknown process and allowing execution of the unknown process, such that on identifying the unknown process, which tries to access a sensitive asset such as raw database tables or an unknown process that carries out an operation that is usually considered advanced such as establishing a network connection to external network, blocking the access or operation of the unknown process or increasing the severity level of the alert that is generated as a part of the sensitive access or operation of the unknown process.

According to one embodiment herein, a method for tainting suspicious processes and applying targeted rules is provided. The method comprises logging telemetry data, transferring the logged telemetry data over a network, and consolidating and aggregating the logged telemetry data received from multiple workloads. The method further includes identifying workload behavior and transmitting known behavior information. In addition, the method includes monitoring workload behavior upon receiving the known behavior information. The workload behavior includes both known and unknown processes, applications that require access to one or more sensitive assets and file system paths, and processes using sensitive operations. The method further involves tainting the unknown process, on detecting the unknown process while monitoring the workload behavior. Furthermore, the method involves blocking the access and operation of the tainted unknown process, and raising an alert while the tainted unknown process tries to access the sensitive assets or sensitive operations.

According to one embodiment herein, the telemetry data is a kernel event concerning workload behavior with cloud context and includes details about the process, file system, network, and system call activities. The telemetry data is logged using security instruments like Extended Berkeley Packet Filter (eBPF) and transferred over the network using a general-purpose remote procedure call (gRPC). The eBPF is a Linux kernel technology enabling developers to build programs that run securely in kernel space. eBPF lets developers tackle a wide range of challenges related to networking, observability, and security, by providing safe access to the innermost workings of the operating system. In addition, gRPC is a framework for remote procedure calls that allows clients and servers to communicate across different machines and languages. The gRPC uses protocol buffers as its data serialization format, which are efficient and extensible binary messages. Moreover, the kernel event is then combined with information from container APIs to provide full telemetry data with all fields populated and full context.

According to one embodiment herein, the method is aided by a plurality of components including a Container Network Interface (CNI) and a Container Orchestration System. The CNI is responsible for managing the network operations and carrying out policy decisions for ingress and egress communication, and the container orchestration system, such as Kubernetes helps to access logs, system audit logs, and service mesh policy violations.

According to one embodiment herein, the workload behavior is the event generated in the form of telemetry data. The workload behavior includes various processes that are being executed, various applications that require access to one or more sensitive assets and file system paths, and various processes using sensitive operations, such as network connections, use of raw sockets, setgid ( ), setsuid ( ), etc.

According to one embodiment herein, the known behavior information includes a list of processes that are allowed to be executed, and also the list of sensitive assets and operations accessed by the list of processes. Furthermore, while transmitting known behavior information security policies are created. The method for creating security policies is provided. The method includes receiving telemetry data over the network, identifying workload behavior, and generating workload behavior summary, identifying sensitive assets, generating security policies, and transmitting security policies over the network. In addition, the workload behavior summary is generated by aggregating telemetry data in a data store.

According to one embodiment herein, the sensitive assets are entities in an application workload that contain valuable information and require heightened protection due to their critical nature. The sensitive assets in the usual classification are any access that is considered breaking out of a container. The "container breakout" or breaking out of a container is used to indicate a situation in which a program running inside the container can overcome isolation mechanisms and gain additional capabilities or access to confidential information or sensitive assets on the host.

According to one embodiment herein, the method also involves automatically adding mount points, network ports, and/or privileged capabilities and blocking access to the sensitive assets. The mount points are part of the workload configuration comprising workload Name and workload ID, received from the telemetry data. The mount points and other sensitive assets like container ports from container runtime and container orchestrator APIs, for example, Docker and Kubernetes based on the Workload ID and Workload Name are extracted and mapped to workload behavior to generate security policies around sensitive assets.

Furthermore, the mount points are the locations where the host filesystem or external storage volumes and filesystems are attached and made accessible within containers or pods. These points act as a point of breach and are critical in nature. Hence, mount points are one form of sensitive assets hence securing is essential.

According to one embodiment herein, the known process of the workload behavior includes a list of Linux binary executions that are part of known workload behavior and the unknown process includes the list of Linux binary executions that are not part of known workload behavior. Furthermore, the known workload behavior is the workload behavior that is already generated, aggregated, profiled, and analyzed by the method.

According to one embodiment herein, the tainting involves setting a flag in the context of the unknown process in the kernel. On generating the security policies that have the set of known processes and their access to the sensitive assets, the method monitors the activities of each and every process. However, on detecting the unknown processes the method starts tracking the unknown process in the kernel by leveraging security instruments and allows arbitrary access to the unknown process that does not access the sensitive assets while blocking the unknown process and denying access if it accesses the sensitive assets. The security instruments may be kernel-level instruments, such as Linux Security Modules, eBPF, and Seccomp, or user space kernel mechanisms like PTrace and LD_Preload.

According to one embodiment herein, a system for tainting suspicious processes and applying targeted rules is provided. The system comprises an observability and enforcement engine configured to log and transfer telemetry data. The system further comprises a discovery engine, which is a control pane element, configured to receive the logged telemetry data from the observability and enforcement engine over a network, and also configured to consolidate and aggregate the logged telemetry data from multiple workloads. Further, the discovery engine is also configured to identify workload behavior and transmit known behavior information to the observability and enforcement engine to monitor the workload behavior. The workload behavior includes both known and unknown processes, applications that require access to one or more sensitive assets and file system paths, and processes using sensitive operations. In addition, the observability and enforcement engine is also configured to taint the unknown process, while monitoring the workload behavior, block the access and operation of the tainted unknown process, and raise an alert while the tainted unknown process tries to access sensitive assets or sensitive operations.

According to one embodiment herein, the telemetry data is a kernel event concerning workload behavior with cloud context and includes details about the process, file system, network, and system call activities. The telemetry data is logged using security instruments like Extended Berkeley Packet Filter (eBPF) and transferred over the network using a general-purpose remote procedure call (gRPC). The eBPF is a Linux kernel technology enabling developers to build programs that run securely in kernel space. eBPF lets developers tackle a wide range of challenges related to networking, observability, and security, by providing safe access to the innermost workings of the operating system. In addition, gRPC is a framework for remote procedure calls that allows clients and servers to communicate across different machines and languages. The gRPC uses protocol buffers as its data serialization format, which are efficient and extensible binary messages. Moreover, the kernel event is then combined with information from container APIs to provide full telemetry data with all fields populated and full context.

According to one embodiment herein, the observability and enforcement engine, and the discovery engine are aided by a plurality of components including a Container Network Interface (CNI) and a Container Orchestration System. The CNI is responsible for managing the network operations and carrying out policy decisions for ingress and egress communication, and the container orchestration system, such as Kubernetes helps to access logs, system audit logs, and service mesh policy violations.

According to one embodiment herein, the workload behavior of the discovery engine is the event generated in the form of telemetry data. The workload behavior includes various processes that are being executed, various applications that require access to one or more sensitive assets and file system paths, and various processes using sensitive operations, such as network connections, use of raw sockets, setgid ( ), setsuid ( ), etc.

According to one embodiment herein, the known behavior information includes a list of processes that are allowed to be executed, and also the list of sensitive assets and operations accessed by the list of processes. Furthermore, while transmitting known behavior information by the discovery engine to the observability and enforcement engine, security policies are created. The method for creating security policies by the discovery engine is provided. The method includes receiving telemetry data over the network, identifying workload behavior, and generating workload behavior summary, identifying sensitive assets, generating security policies, and transmitting security policies over the network. In addition, the workload behavior summary is generated by aggregating telemetry data in a data store.

According to one embodiment herein, the sensitive assets are entities in an application workload that contain valuable information and require heightened protection due to their critical nature. The sensitive assets in the usual classification are any access that is considered breaking out of a container. The "container breakout" or breaking out of a container is used to indicate a situation in which a program running inside the container can overcome isolation mechanisms and gain additional capabilities or access to confidential information or sensitive assets on the host.

According to one embodiment herein, the observability and enforcement engine is also configured to automatically add mount points, network ports, and/or privileged capabilities and block, access to the sensitive assets. The mount points are part of the workload configuration comprising workload Name and workload ID, received from the telemetry data. The mount points and other sensitive assets like container ports from container runtime and container orchestrator APIs, for example, Docker and Kubernetes based on the Workload ID and Workload Name are extracted and mapped to workload behavior to generate security policies around sensitive assets.

Furthermore, the mount points are the locations where the host filesystem or external storage volumes and filesystems are attached and made accessible within containers or pods. These points act as a point of breach and are critical in nature. Hence, mount points are one form of sensitive assets hence securing is essential.

According to one embodiment herein, the known process of the workload behavior includes a list of Linux binary executions that are part of known workload behavior and the unknown process includes the list of Linux binary executions that are not part of known workload behavior. Furthermore, the known workload behavior is the workload behavior that is already generated, aggregated, profiled, and analyzed by the system.

According to one embodiment herein, the tainting by the observability and enforcement engine involves setting a flag in the context of the unknown process in the kernel. The discovery engine generates the security policies that have the set of known processes and their access to the sensitive assets and transmits the security policies comprising the set of known processes and their access to the sensitive assets to the observability and enforcement engine. The observability and enforcement engine monitors the activities of each and every process. However, on detecting the unknown processes the observability and enforcement engine starts tracking the unknown process in the kernel by leveraging security instruments and allows arbitrary access to the unknown process that does not access the sensitive assets while blocking the unknown process and denying access if it accesses the sensitive assets. The security instruments may be kernel-level instruments, such as Linux Security Modules, eBPF, and Seccomp, or user space kernel mechanisms like PTrace and LD_Preload.

Figure 2:
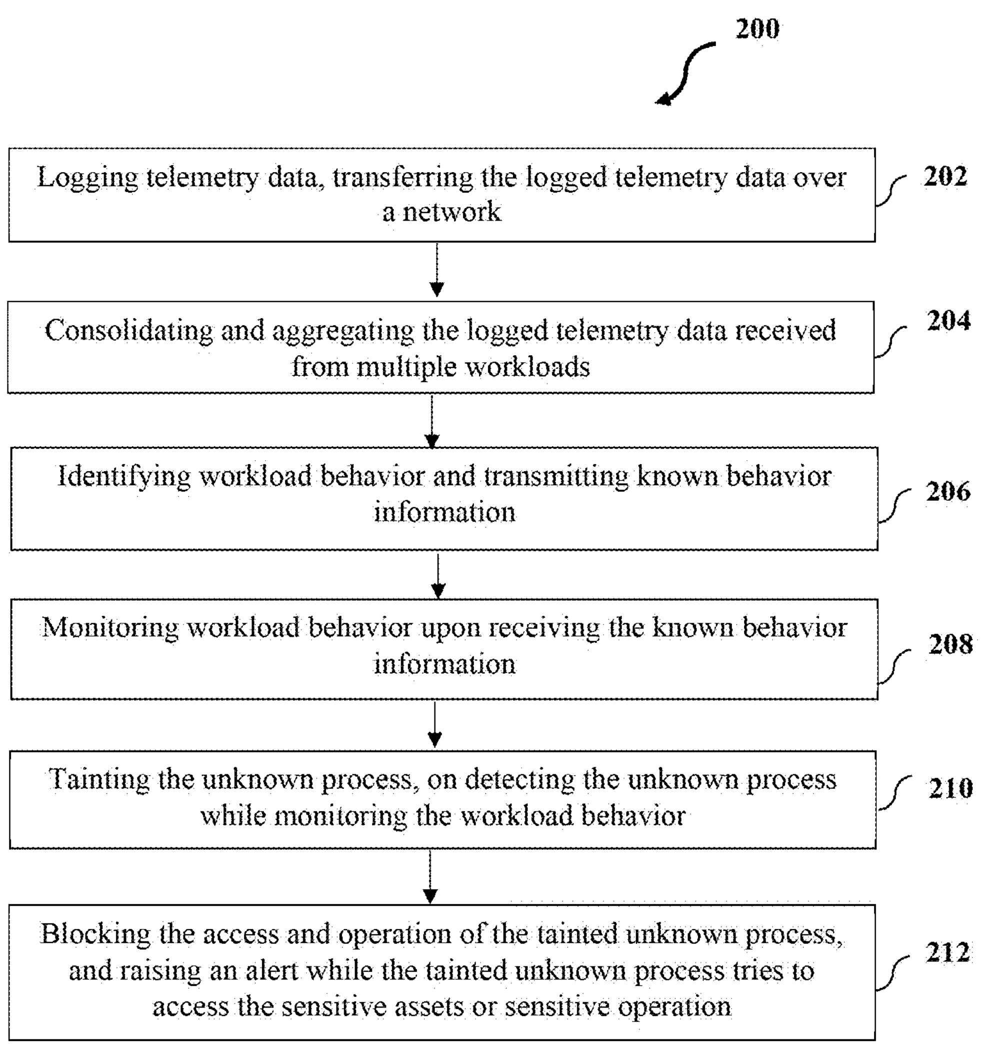
FIG. 2 illustrates a flowchart on a method for tainting suspicious process and applying targeted rules to such suspicious process, according to an embodiment herein.

FIG. 2 illustrates a flowchart on a method for tainting suspicious process and applying targeted rules to such suspicious process, according to an embodiment herein. The method 200 comprises logging telemetry data and transferring the logged telemetry data over a network at step 202. The method 200 further comprises consolidating and aggregating the logged telemetry data received from multiple workloads at step 204. The method 200 further includes identifying workload behavior and transmitting known behavior information at step 206. In addition, the method 200 includes monitoring workload behavior upon receiving the known behavior information at step 208. The workload behavior includes both known and unknown processes, applications that require access to one or more sensitive assets and file system paths, and processes using sensitive operations. The method 200 further involves tainting the unknown process, on detecting the unknown process while monitoring the workload behavior at step 210. Furthermore, the method 200 involves blocking the access and operation of the tainted unknown process, and raising an alert while the tainted unknown process tries to access the sensitive assets or sensitive operations at step 212.

Figure 3:
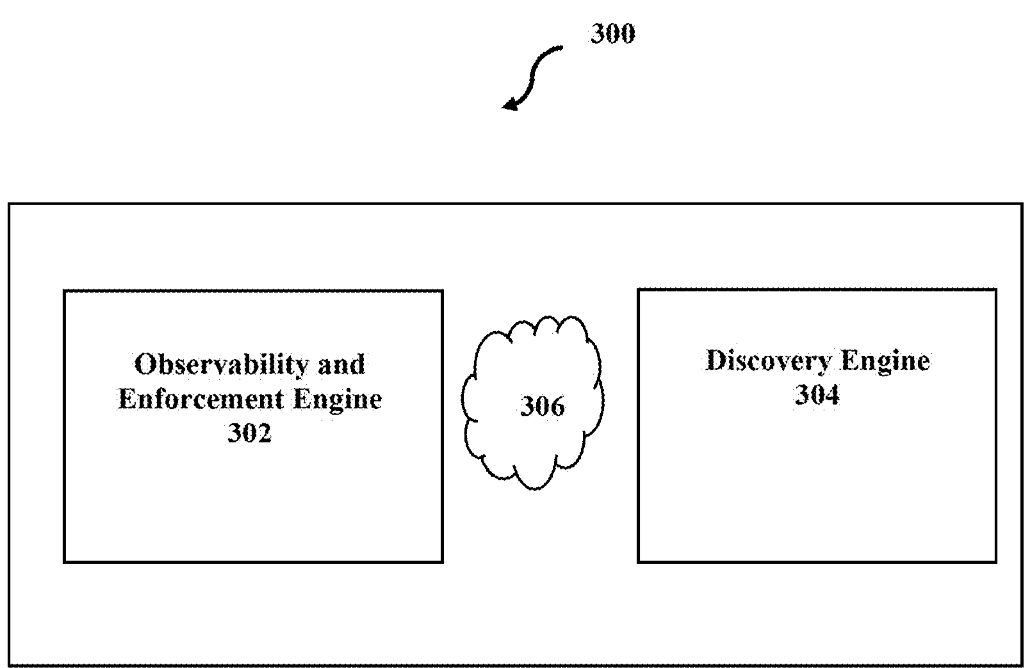
FIG. 3 illustrates a block diagram of an exemplary implementation of a system for tainting suspicious process and applying targeted rules to such suspicious process, according to an embodiment herein.

FIG. 3 illustrates a block diagram of an exemplary implementation of a system for tainting suspicious process and applying targeted rules to such suspicious process, according to an embodiment herein. The system 300 comprises an observability and enforcement engine 302 configured to log and transfer telemetry data. The system 300 further comprises a discovery engine 304, which is a control pane element, configured to receive the logged telemetry data from the observability and enforcement engine 302 over a network 306, and also configured to consolidate and aggregate the logged telemetry data from multiple workloads. Further, the discovery engine 304 is also configured to identify workload behavior and transmit known behavior information to the observability and enforcement engine 302 to monitor the workload behavior. The workload behavior includes both known and unknown processes, applications that require access to one or more sensitive assets and file system paths, and processes using sensitive operations. In addition, the observability and enforcement engine 302 is also configured to taint the unknown process, while monitoring the workload behavior, block the access and operation of the tainted unknown process, and raises an alert while the tainted unknown process tries to access sensitive assets or sensitive operations.

Figure 4:
FIG. 4 illustrates a block diagram of a discovery engine configured to generate security policies, according to an embodiment herein.
Figure 4:
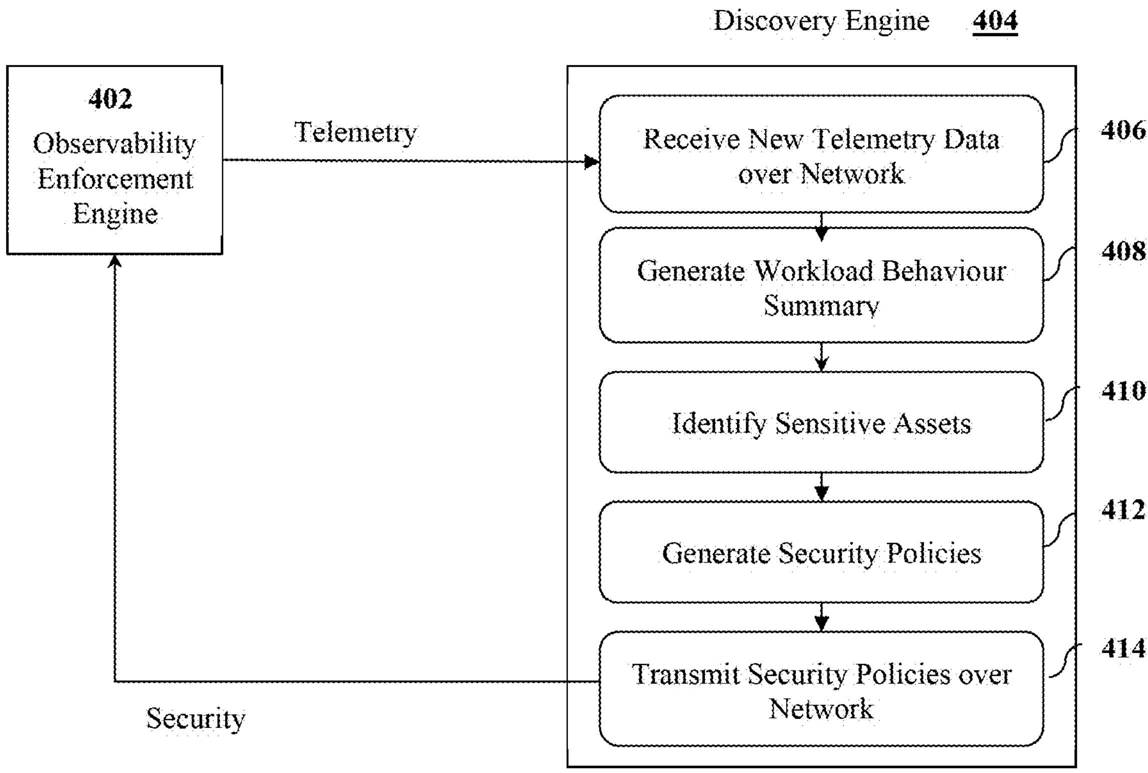

FIG. 4 illustrates a block diagram of a discovery engine configured to generate security policies, according to an embodiment herein. The discovery engine 404 while transmitting known behavior information to the observability and enforcement engine 402, security policies are created. The method for creating security policies by the discovery engine 404 is provided. The method includes receiving telemetry data over the network at step 406, identifying workload behavior and generating workload behavior summary at step 408, identifying sensitive assets at step 410, generating security policies at step 412, and transmitting security policies over the network at step 414. In addition, the workload behavior summary is generated by aggregating telemetry data in a data store.

Figure 5:
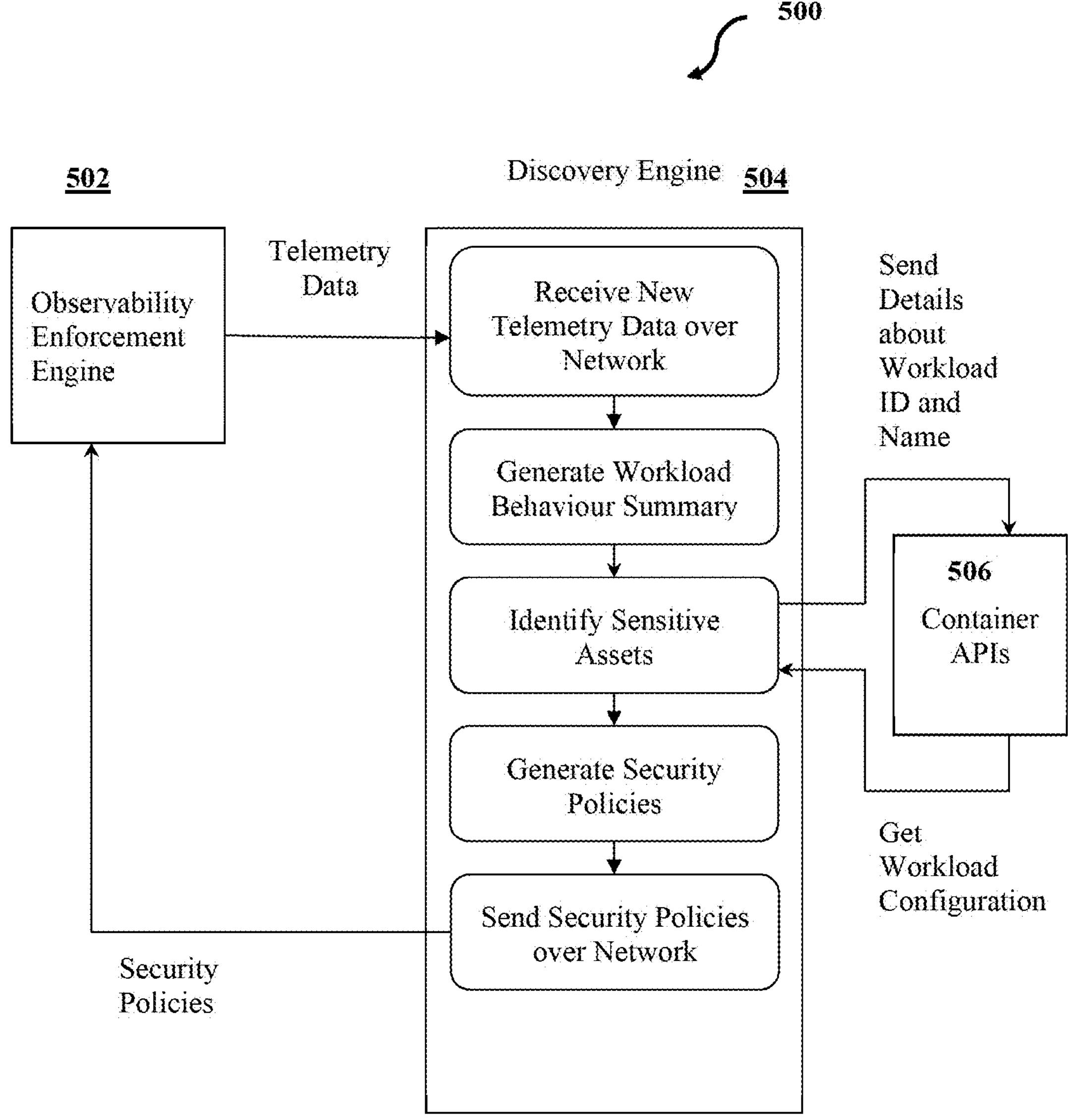
FIG. 5 illustrates a block diagram of an exemplary system for obtaining workload configuration, according to an embodiment herein.

FIG. 5 illustrates a block diagram of an exemplary system for obtaining workload configuration, according to an embodiment herein. The observability and enforcement engine 502 of the system 500 is configured to automatically add mount points, network ports, and/or privileged capabilities and block, access to the sensitive assets. The mount points are part of the workload configuration comprising workload Name and workload ID, received from the telemetry data. On identifying the sensitive assets by the discovery engine 504 the workload ID and the workload Name are sent to container APIs 506 to obtain workload configuration including container ports and mount points. The mount points and other sensitive assets like container ports from container runtime and container orchestrator APIs, for example, Docker and Kubernetes are based on the Workload ID and Workload Name, that are extracted and mapped to workload behavior to generate security policies around sensitive assets.

Figure 6:
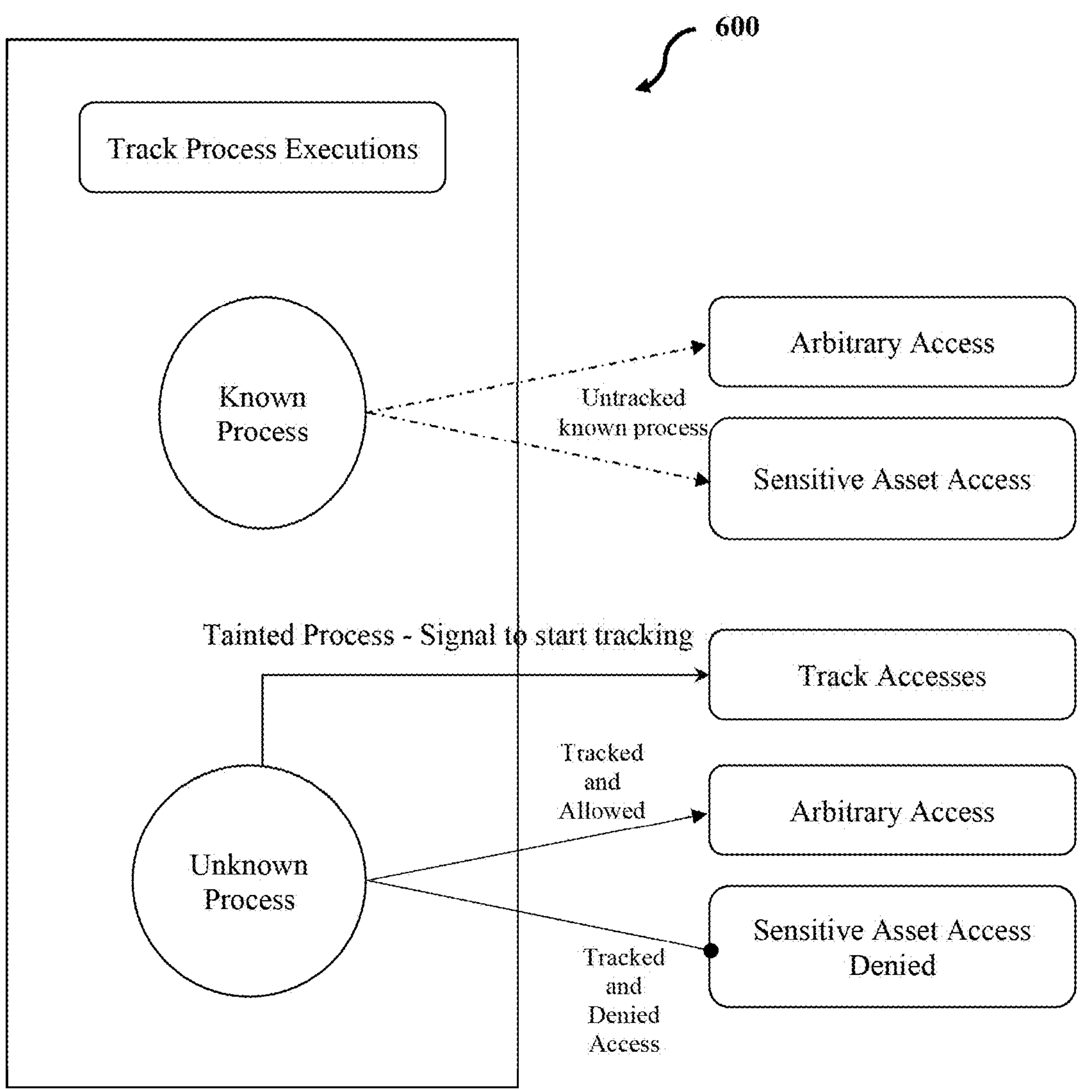
FIG. 6 illustrates a block diagram of an exemplary system for tainting the unknown process, according to an embodiment herein.

FIG. 6 illustrates a block diagram of an exemplary system for tainting the unknown process, according to an embodiment herein. FIG. 6 illustrates the system 600 for tainting the unknown process. The tainting involves setting a flag in the context of the unknown process in the kernel. On generating the security policies that have the set of known processes and their access to the sensitive assets, the system 600 monitors the activities of each and every process. However, on detecting the unknown processes the system 600 starts tracking the unknown process in the kernel by leveraging security instruments and thus allowing arbitrary access to the unknown process that does not access the sensitive assets while blocking the unknown process and denying access if it accesses the sensitive assets. The security instruments may be kernel-level instruments, such as Linux Security Modules, eBPF, and Seccomp, or user space kernel mechanisms like PTrace and LD_Preload. Furthermore, the system 600 does not track the known process as they are known and have arbitrary access and sensitive asset access.

Figure 7:
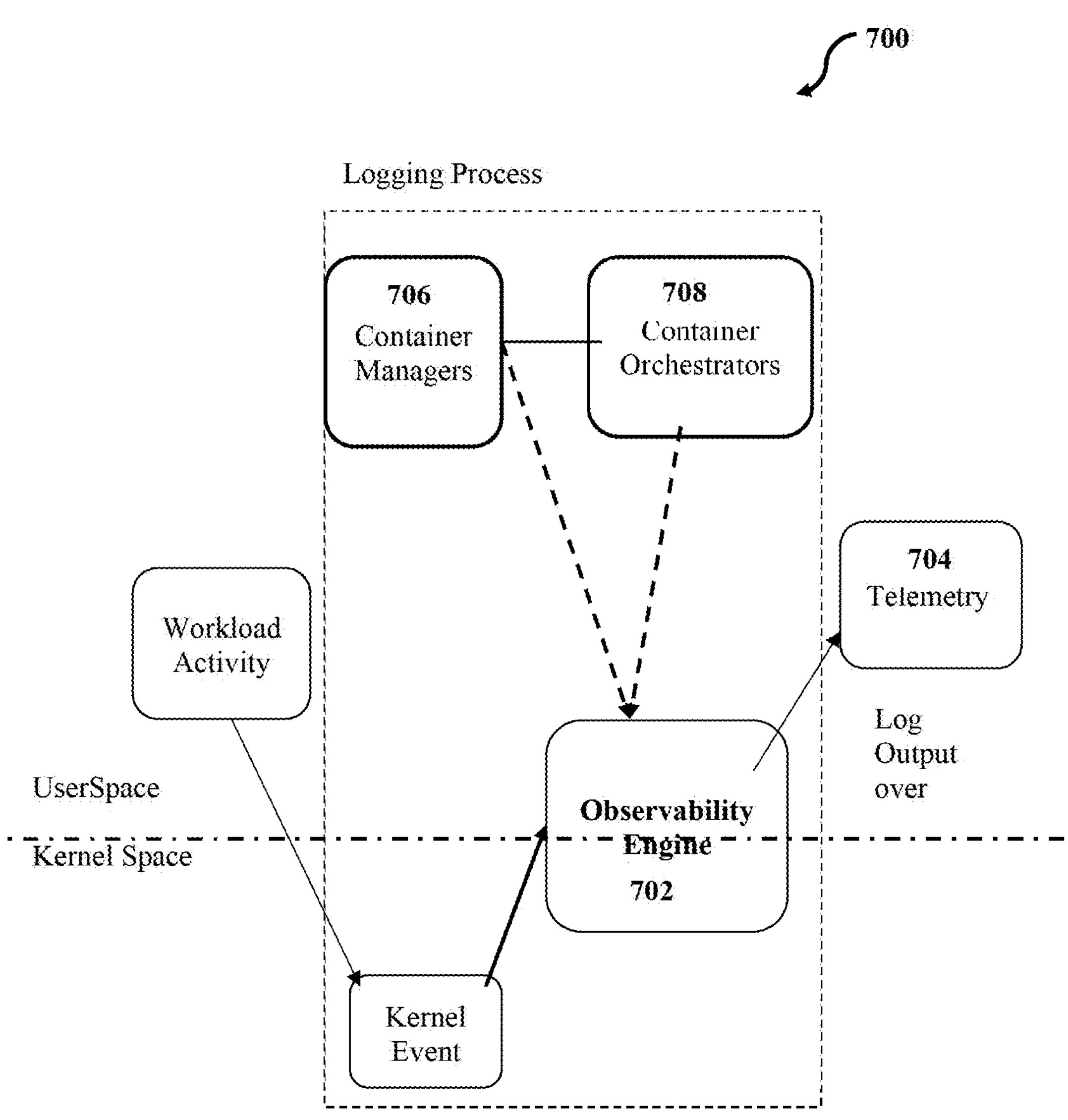
FIG. 7 illustrates the observability engine for logging telemetry data, according to an embodiment herein.

FIG. 7 illustrates the observability engine for logging telemetry data, according to an embodiment herein. FIG. 7, 700 illustrates the observability and enforcement engine 702 is configured to log and transfer telemetry data 704. The telemetry data 704 is a kernel event concerning workload behavior with cloud context, and includes details about the process, file system, network, and system call activities. The observability engine 702 with help of container managers 706 and container orchestrators 708 logs the telemetry data 704. Furthermore, the observability engine 702 also uses security instruments like the Extended Berkeley Packet Filter (eBPF) to log and transfer over the network using a general-purpose remote procedure call (gRPC). The eBPF is a Linux kernel technology that enables developers to build programs that run securely in kernel space. eBPF lets developers tackle a wide range of challenges related to networking, observability, and security, by providing safe access to the innermost workings of the operating system. In addition, gRPC is a framework for remote procedure calls that allows clients and servers to communicate across different machines and languages. The gRPC uses protocol buffers as its data serialization format, which are efficient and extensible binary messages. Moreover, the kernel event is then combined with information from container APIs to provide full telemetry data with all fields populated and full context.

Figure 8:
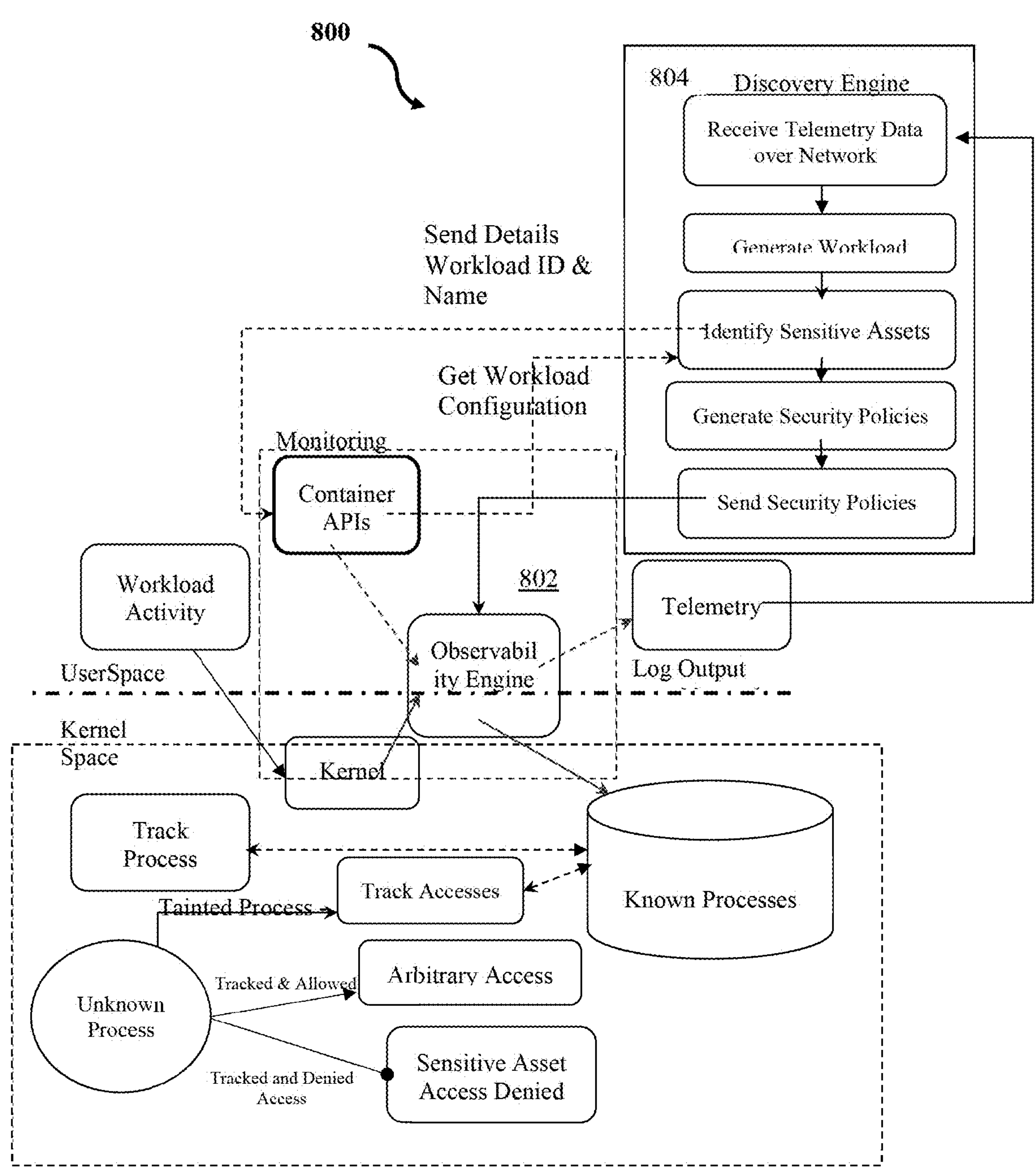
FIG. 8 illustrates an exemplary block diagram of the system configured to block access of the tainted unknown process while accessing the sensitive assets, according to an embodiment herein.

FIG. 8 illustrates an exemplary block diagram of the system configured to block access of the tainted unknown process while accessing the sensitive assets, according to an embodiment herein. The system 800 illustrates the discovery engine 804 configured to generate the security policies that have the set of known processes and their access to the sensitive assets and transmits the security policies comprising the set of known processes and their access to the sensitive assets to the observability and enforcement engine 802. The observability and enforcement engine 802 monitors the activities of each and every process. However, on detecting the unknown processes the observability and enforcement engine 802 starts tracking the unknown process in the kernel by leveraging security instruments and allows arbitrary access to the unknown process that does not access the sensitive assets while blocking the unknown process and denying access if it accesses the sensitive assets. The security instruments may be kernel-level instruments, such as Linux Security Modules, eBPF, and Seccomp, or user space kernel mechanisms like PTrace and LD_Preload.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail above. It should be understood, however, that it is not intended to limit the disclosure to the forms disclosed, but on the contrary, the disclosure is to cover all modifications, equivalents, and alternatives falling within the scope of the disclosure.

The embodiments herein disclose a system and a method for tainting suspicious processes and applying targeted rules to such suspicious processes. The method involves tainting/tagging/marking unknown process and allowing execution of the unknown process, such that on identifying the unknown process, which tries to access a sensitive asset such as raw database tables or unknown process which carries out an operation that is usually considered advanced such as establishing network connection to external network, blocking the access or operation of the unknown process or increasing the severity level of the alert that is generated as a part of the sensitive access or operation of the unknown process.

Hence, the primary objective of the embodiment herein is to identify an unknown process, taint/tag the unknown process, and allow it to carry out operations that might be considered not so dangerous, but if the unknown process tries to access any sensitive asset or operation, then blocking that operation and raising an alert. Hence, the embodiment herein has the ability to auto-escalate the risk profile of the operations if they are invoked by the tainted process. Furthermore, the embodiment herein also reduces the risk of enforcing a Zero Trust security posture, wherein the Zero Trust Security Posture involves completely blocking unknown operations, without allowing to execute. By tainting unknown processes and targeting only sensitive actions, the embodiment herein ensures that a blanket ban on unknown processes is not applied. Moreover, the embodiment herein reduces the risk of application downtime because of execution of unknown process, which is benign. The benign processes are those that do not access any sensitive assets or do not use any sensitive operation. Furthermore, the embodiment herein establishes an unknown process as benign or not by the actions executed by the unknown process after spawning. Hence, the embodiment herein has a way to categorize unknown processes, taint the same, and then apply restrictions. Besides, the embodiment herein automatically increase the severity of the alert if the operation is attempted by an unknown process or a tainted process, thereby overcomes the huge problem faced by the security solutions, which tries to raise an alert if an unknown operation is attempted. Therefore, the embodiment herein finds application in security policy enforcement solutions that do not want to block any benign operations from unknown processes thus ensuring no downtime to the application, in runtime security solutions and Zero Trust Runtime Security solutions such as Palo Alto Prisma, Aquasec, Sysdig etc.

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phrases or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A method for tainting suspicious processes and applying targeted rules to the suspicious processes, the method comprising steps of:

logging telemetry data corresponding to a plurality of application workloads, and transferring logged telemetry data over a network, and wherein the telemetry data is logged using kernel-level security instruments executed in kernel space;

consolidating and aggregating the logged telemetry data received from the plurality of application workloads;

identifying workload behavior for a plurality of processes under execution, and transmitting known behavior information;

monitoring the workload behavior upon receiving the known behavior information and wherein the workload behavior is monitored for known processes and an unknown processes, applications requiring access to one or more sensitive assets or file system paths, and the processes using sensitive operations;

tracking the unknown processes in-kernel by using the kernel-level security instruments, and providing arbitrary access to the unknown processes that are not accessing the sensitive assets, the file system paths, or the sensitive operations, and blocking the unknown processes that attempt to access the sensitive assets, the file system paths, or the sensitive operations;

tainting the unknown processes while monitoring the workload behavior, on detecting that the unknown processes are attempting to access the sensitive assets, the file system paths, or the sensitive operations, and wherein the step of tainting the unknown processes includes setting a flag in-kernel for each of the unknown processes determined as attempting to access the sensitive assets, the file system paths, or the sensitive operations; and blocking tainted unknown processes and raising an alert when any of the tainted unknown processes attempt to access the sensitive assets, the file system paths, or the sensitive operations, and automatically escalating a risk profile corresponding to any of the sensitive assets, the file system paths, and the sensitive operations invoked by the tainted unknown processes.

2. The method according to claim 1, wherein the telemetry data is a kernel event indicative of the workload behavior with a cloud context, and includes details corresponding to the processes under execution, file systems, network operations, and system call activities, and wherein the kernel event is combined with information derived from container APIs to provide complete telemetry data with full context.

3. The method according to claim 1, further comprises deploying a Container Network Interface (CNI) and a Container Orchestration System, and wherein the CNI manages network operations and carries out policy decisions for ingress and egress communication, and wherein the container orchestration system accesses system audit logs, and service mesh policy violations.

4. The method according to claim 1, wherein the known behavior information includes a list of the processes allowed to be executed, and a list of the sensitive assets and the sensitive operations accessed by each of the processes in the list.

5. The method according to claim 1, wherein the method further includes a step of creating security policies and wherein the step of creating the security policies comprise:

receiving the telemetry data over the network;

identifying the workload behavior and generating a workload behavior summary;

identifying the sensitive assets;

generating the security policies; and transmitting the security policies over the network.

6. The method according to claim 1, wherein the sensitive assets are entities that contain valuable information and necessitate heightened protection due to critical nature thereof.

7. The method according to claim 1, wherein the method involves automatically adding mount points, network ports, and privileged capabilities and blocking the tainted unknown processes from accessing the sensitive assets, the file system paths, or the sensitive operations.

8. The method according to claim 1, wherein the known processes include a list of Linux binary executions that are a part of a known workload behavior and the unknown processes include a list of the Linux binary executions that are not a part of the known workload behavior, and wherein the known workload behavior is the workload behaviour which has been previously generated, aggregated, profiled and analyzed.

9. A system for tainting suspicious processes and applying targeted rules, the system comprising:

an observability and enforcement engine configured to log telemetry data corresponding to a plurality of application workloads, and transfer logged telemetry data, the observability and enforcement engine configured to log the telemetry data using kernel-level security instruments executed in kernel space;

a discovery engine configured to:

receive the logged telemetry data from the observability and enforcement engine over a network, and consolidate and aggregate the logged telemetry data received from the plurality of application workloads;

identify workload behavior for a plurality of processes under execution and transmit known behavior information to the observability and enforcement engine and trigger the observability and enforcement engine to monitor the workload behavior, and wherein the workload behavior is monitored for known processes and unknown processes, applications that require access to one or more sensitive assets or file system paths, and the processes using sensitive operations;

track the unknown processes in-kernel by using the kernel-level security instruments, and provide arbitrary access to the unknown processes that are not accessing the sensitive assets, the file system paths, or the sensitive operations, and block the unknown processes that attempt to access the sensitive assets, the file system paths, or the sensitive operations;

taint the unknown processes, while monitoring the workload behavior, on detecting that the unknown processes are attempting to access the sensitive assets, the file system paths, or the sensitive operations, and wherein the observability and enforcement engine taints the unknown processes by setting a flag in-kernel for each of the unknown processes determined as attempting to access the sensitive assets, the file system paths, or the sensitive operations; and block tainted unknown processes, and raise an alert when any of the tainted unknown processes attempt to access the sensitive assets, the file system paths, or the sensitive operations, and automatically escalate a risk profile corresponding to any of the sensitive assets, the file system paths, and the sensitive operations invoked by the tainted unknown processes.

10. The system according to claim 9, wherein the telemetry data is a kernel event indicative of the workload behavior with cloud context, and includes details corresponding to the processes under execution, file systems, network operations, and system call activities, and wherein the kernel event is combined with information derived from container APIs to provide complete telemetry data with full context.

11. The system according to claim 9, wherein the observability and enforcement engine, and the discovery engine cooperate with a Container Network Interface (CNI) and a Container Orchestration System, and wherein the CNI manages network operations and implements policy decisions for ingress and egress communication, and wherein the container orchestration system accesses logs, system audit logs, and service mesh policy violations.

12. The system according to claim 9, wherein the workload behavior is an event generated in form of telemetry data.

13. The system according to claim 9, wherein the known behavior information includes a list of the processes allowed to be executed, and a list of the sensitive assets and the sensitive operations accessed by each of the processes in the list.

14. The system according to claim 9, wherein the observability and enforcement engine is configured to automatically add mount points, network ports, and privileged capabilities, and blocks tainted unknown processes from accessing the sensitive assets, the file system paths, or the sensitive operations.

15. The system according to claim 9, wherein the known processes include a list of Linux binary executions that are part of known workload behavior and the unknown processes include a list of the Linux binary executions that are not a part of the known workload behavior, and wherein the known workload behavior is the workload behavior previously generated, aggregated, profiled and analyzed.

16. A non-transitory computer-readable storage medium having computer-executable instructions stored thereon, the computer-executable instructions when executed by a processor, cause the processor to:

log telemetry data corresponding to a plurality of application workloads, and transfer logged telemetry data over a network, and wherein the telemetry data is logged using kernel-level security instruments executed in kernel space;

consolidate and aggregate the logged telemetry data received from the plurality of application workloads;

identify workload behavior for a plurality of processes under execution, and transmit known behavior information;

monitor the workload behavior upon receiving the known behavior information, wherein the workload behavior is monitored for known processes and unknown processes, applications requiring access to one or more sensitive assets or file system paths, and the processes using sensitive operations;

track the unknown processes in-kernel by using the kernel-level security instruments, and provide arbitrary access to the unknown processes that are not accessing the sensitive assets, the file system paths, or the sensitive operations, and block the unknown processes that attempt to access the sensitive assets, the file system paths, or the sensitive operations;

tainting the unknown processes while monitoring the workload behavior, on detecting that the unknown processes are attempting to access the sensitive assets, the file system paths, or the sensitive operations, and setting a flag in-kernel for each of the unknown processes determined as attempting to access the sensitive assets, the file system paths, or the sensitive operations; and block tainted unknown processes and raise an alert when any of the tainted unknown processes attempt to access the sensitive assets, the file system paths, or the sensitive operations, and automatically escalate a risk profile corresponding to any of the sensitive assets, the file system paths, and the sensitive operations invoked by the tainted unknown processes.

17. The non-transitory computer-readable storage medium as claimed in claim 16, wherein the workload behavior is an event generated in form of telemetry data, and wherein the telemetry data is a kernel event indicative of the workload behavior with a cloud context, and includes details corresponding to the processes under execution, file systems, network operations, and system call activities, and wherein the kernel event is combined with information derived from container APIs to provide complete telemetry data with full context.

18. The non-transitory computer-readable storage medium as claimed in claim 16, wherein the known behavior information includes a list of the processes allowed to be executed, and a list of the sensitive assets and the sensitive operations accessed by each of the processes in the list, and wherein the processor automatically adds mount points, network ports, and privileged capabilities, and blocks tainted unknown processes from accessing the sensitive assets, the file system paths, or the sensitive operations.

* * * * *